US012739856B2

(12) United States Patent
Kumar et al.

(10) Patent No.: US 12,739,856 B2
(45) Date of Patent: Sep. 15, 2026

(54) INTELLIGENT UPLINK-DOWNLINK ARBITRATION TO MEET CRITICAL TIMELINE FOR NEW RADIO (NR) INTERNET OF THINGS (IOT)

(71) Applicant: QUALCOMM Incorporated, San Diego, CA (US)

(72) Inventors: Lalit Kumar, Bangalore (IN); Sreekumar Padmanabhan, Bangalore (IN); Vinay Jain, Bengaluru (IN); Manik Tyagi, Bengaluru (IN); Gautham Kumar Reddy Adireddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 18/638,532

(22) Filed: Apr. 17, 2024

(65) Prior Publication Data

US 2025/0330997 A1 Oct. 23, 2025

(51) Int. Cl.

*H04W 72/232* (2023.01)
*H04W 12/03* (2021.01)
*H04W 12/10* (2021.01)
*H04W 72/1273* (2023.01)

(52) U.S. Cl.

CPC ......... *H04W 72/232* (2023.01); *H04W 12/03* (2021.01); *H04W 12/10* (2013.01); *H04W 72/1273* (2013.01)

(58) Field of Classification Search

CPC ... H04W 72/232; H04W 12/03; H04W 12/10; H04W 72/1273; H04W 72/1263; H04W 72/23

See application file for complete search history.

(56) References Cited

U.S. PATENT DOCUMENTS 12,052,662 B2 * 7/2024 Kung ................ H04W 72/0446
12,088,517 B2 * 9/2024 Chae ..................... H04L 1/1893
2022/0312389 A1 * 9/2022 Li ......................... H04W 72/02
2023/0064680 A1 * 3/2023 Huang .............. H04W 74/0816

FOREIGN PATENT DOCUMENTS

WO WO-2022255679 A1 * 12/2022 .......... H04W 72/569

* cited by examiner

*Primary Examiner* — Afshawn M Towfighi
(74) *Attorney, Agent, or Firm* — Polsinelli

(57) ABSTRACT

According to various aspects, a first device can: receive, from a second device, control information indicating a grant for transmission; generate a transport block packet for transmission based on the control information; output a packet operations trigger indicating hardware to start processing packet operations; alternate processing, by the hardware, of uplink packet operations and downlink packet operations based on the packet operations trigger; output an event-based or timer-based trigger indicating the hardware to cease other processing and start processing the transport block packet; process, by the hardware, the transport block packet based on receiving the event-based/timer-based trigger; encode, by the hardware, the transport block packet based on completion of processing the transport block packet to produce a ciphered transport block packet; and transmit, to the second device, the ciphered transport block packet prior to expiration of a timeline.

20 Claims, 10 Drawing Sheets

500
510
502
UL PB REQ
504
UL PP REQ
506
DL PP REQ
Round-Robin scheduling
580
Internal Memory
565
Internal Memory
570
Cipher
MACI Computation
Destination select
De-Cipher
MACI Validation
535
Parser/FnR
515
550
ENCIB
AXI
AXI
505
530
545

INTELLIGENT UPLINK-DOWNLINK ARBITRATION TO MEET CRITICAL TIMELINE FOR NEW RADIO (NR) INTERNET OF THINGS (IOT)

FIELD

The present disclosure generally relates to wireless communications. For example, aspects of the present disclosure relate to intelligent uplink-downlink (UL-DL) arbitration to meet critical timeline (e.g., N2 timeline) for new radio (NR) internet of things (IOT) and wearable devices.

BACKGROUND

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for intelligent UL-DL arbitration to meet critical timeline (e.g., N2 timeline) for NR IOT and wearable devices. According to at least one example, a first device for wireless communications is provided. The first device includes at least one memory configured to store software of the first device and at least one processor coupled to the at least one memory and configured to: receive, from a second device, control information indicating a grant for transmission; generate a transport block packet for transmission based on the control information; output, using the software of the first device, a packet operations trigger indicating hardware of the first device to start processing packet operations; process, by the hardware of the first device, uplink packet operations and downlink packet operations in an alternating manner based on receiving the packet operations trigger; output, using the software, one of an event-based trigger or a timer-based trigger indicating the hardware to cease other processing and start processing the transport block packet; process, by the hardware, the transport block packet based on receiving one of the event-based trigger or the timer-based trigger; encode, by the hardware, the transport block packet based on completion of processing the transport block packet to produce a ciphered transport block packet; and output, for transmission to the second device, the ciphered transport block packet prior to expiration of a timeline.

In another illustrative example, a method is provided for wireless communications. The method includes: receiving, by a first device from a second device, control information indicating a grant for transmission; generating, by the first device, a transport block packet for transmission based on the control information; outputting, by software of the first device, a packet operations trigger indicating hardware of the first device to start processing packet operations; processing, by the hardware of the first device, uplink packet operations and downlink packet operations in an alternating manner based on receiving the packet operations trigger; outputting, by the software, one of an event-based trigger or a timer-based trigger indicating the hardware to cease other processing and start processing the transport block packet; processing, by the hardware, the transport block packet based on receiving one of the event-based trigger or the timer-based trigger; encoding, by the hardware, the transport block packet based on completion of processing the transport block packet to produce a ciphered transport block packet; and transmitting, by the first device to the second device, the ciphered transport block packet prior to expiration of a timeline.

In another illustrative example, a non-transitory computer-readable medium is provided having stored thereon instructions that, when executed by at least one processor, cause the at least one processor to: receive, from a second device, control information indicating a grant for transmission; generate a transport block packet for transmission based on the control information; output, using the software of the first device, a packet operations trigger indicating hardware of the first device to start processing packet operations; process, by the hardware of the first device, uplink packet operations and downlink packet operations in an alternating manner based on receiving the packet operations trigger; output, using the software, one of an event-based trigger or a timer-based trigger indicating the hardware to cease other processing and start processing the transport block packet; process, by the hardware, the transport block packet based on receiving one of the event-based trigger or the timer-based trigger; encode, by the hardware, the transport block packet based on completion of processing the transport block packet to produce a ciphered transport block packet; and output, for transmission to the second device, the ciphered transport block packet prior to expiration of a timeline.

In another illustrative example, a first device is provided for wireless communications. The first device includes: means for receiving, from a second device, control information indicating a grant for transmission; means for generating a transport block packet for transmission based on the control information; means for outputting, via software of the first device, a packet operations trigger indicating hardware of the first device to start processing packet operations; means for processing, via the hardware of the first device, uplink packet operations and downlink packet operations in an alternating manner based on receiving the packet operations trigger; means for outputting, via the software, one of an event-based trigger or a timer-based trigger indicating the hardware to cease other processing and start processing the transport block packet; means for processing, via the hardware, the transport block packet based on receiving one of the event-based trigger or the timer-based trigger; means for encoding, via the hardware, the transport block packet based on completion of processing the transport block packet to produce a ciphered transport block packet; and means for transmitting, to the second device, the ciphered transport block packet prior to expiration of a timeline.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
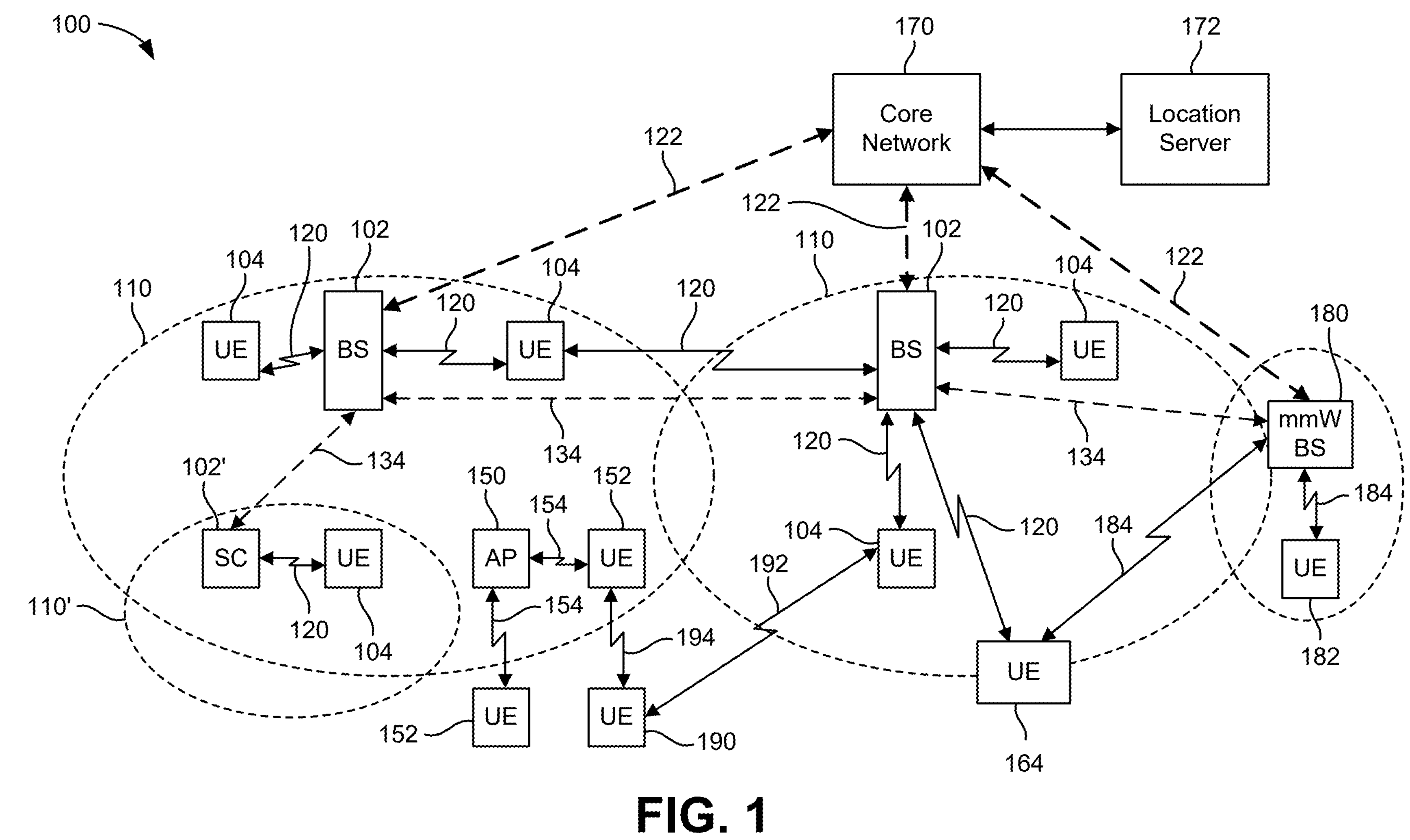
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, various client devices can be utilized that may be associated with different signaling and communication needs. For example, as 5G networks expand into industrial verticals and the quantity of deployed Internet-of-Things (IoT) devices grows, network service categories such as enhanced Mobile Broadband (eMBB), Ultra Reliable Low Latency Communications (URLLC), and massive Machine Type Communications (mMTC), etc., may be expanded to better support various IoT devices, which can include passive IoT devices, semi-passive IoT devices, etc.

Currently, for IoT and wearable devices (e.g., user equipment), the throughput (e.g., data rate) to be supported is lower than as compared to mobile phones (e.g., smart phones) and tablets. The data rate for IoT and wearable devices is typically less than one-hundred (100) megabits per second (Mbps) for the uplink (UL) signaling, for the downlink (DL) signaling, or for both the uplink and downlink signaling.

The layer 2 (L2) processing within the IoT and wearable devices consists of internet protocol (IP) packet parsing and filtering, header insertion, ciphering, etc. in the uplink direction (e.g., the direction of transmission of signals from the IoT and wearable devices to a network device, such as a base station). In the downlink direction (e.g., the direction of transmission of signals from a network device, such as a base station, to the IoT and wearable devices), the L2 processing within the IoT and wearable devices consists of deciphering, header extraction, parsing and packet segregation, etc. As these functions in both the uplink and downlink directions are similar, the uplink and downlink hardware (HW) for the L2 processing can be shared, provided that the throughput (e.g., data rate) can be met by the shared hardware. The sharing of L2 hardware for processing for both the uplink and downlink directions is possible for IoT and wearable devices. This sharing of the L2 hardware can reduce the amount of area utilized on the system on a chip (SOC), thereby improving the main key performance indicators (KPIs) for any type of mobile device.

Although the data rate is lower for IoT and wearable devices as compared to that of smartphones and tablets, the IoT and wearable devices still need to adhere to the new radio (NR) specifications. The NR specifications include one parameter that is N2, which specifies a time span between receiving an uplink grant (e.g., a time of receiving an uplink grant from a base station) to a time of being ready to transmit (e.g., a time of transmission, in response to receiving the uplink grant, of an uplink signal to the base station).

Although the shared L2 hardware can help to reduce the area on a system on a chip, the sharing of the L2 hardware for the processing for both the uplink and downlink directions can adversely affect the N2 timeline. The N2 timeline can be adversely affected because the shared L2 hardware could still be occupied performing L2 downlink processing, even after receiving the uplink grant (e.g., from a base station). The shared L2 hardware being occupied with performing the downlink processing can adversely, effectively reduce the available N2 timeline for the uplink processing.

Hence, an intelligent arbitration between the uplink and downlink processing by the L2 hardware is needed for meeting the critical N2 timeline. As such, improved systems and techniques that provide an intelligent uplink-downlink arbitration (e.g., for processing by shared L2 hardware) to meet the critical N2 timeline for NR IOT and wearable devices can be beneficial.

In one or more aspects, systems, apparatuses, processes (also referred to as methods), and computer-readable media (collectively referred to herein as "systems and techniques") are described herein for providing intelligent uplink-downlink arbitration to meet critical timeline (e.g., N2 timeline) for NR IOT and wearable devices. In one or more examples, the systems and techniques can be applied to shared hardware (e.g., L2 hardware) for devices that have low throughputs (e.g., low data rates), such as IOT and wearable devices.

In one or more aspects, the systems and techniques provide software (e.g., L2 software) that can start and end operational codes (OpCodes) for uplink-downlink arbitration lock and unlock (e.g., the starting and stopping of alternating uplink processing and downlink processing by the L2 hardware). In one or more examples, L2 modem software can trigger shared hardware (e.g., L2 hardware) after decoding an uplink grant (e.g., received from a base station).

In one or more examples, the L2 software can know the amount of uplink data to be transmitted by the device (e.g., IOT and/or wearable device) and, as such, the L2 software can prepare the tasks needed to process that amount of data. In some examples, the L2 software can program the number of packets and/or number of bytes to be processed by the L2 hardware for the downlink processing before triggering the uplink-downlink arbitration. The preconfigured number of packets and/or number of bytes can be processed by the L2 hardware for the downlink processing before the triggering of the uplink-downlink arbitration.

In some examples, the L2 hardware for the downlink processing can switch the context (e.g., the configuration) for processing seamlessly with a required store and/or restore (e.g., for cases where there is an interruption in the downlink processing, and then later, the context needs to be restored to resume the downlink processing). In one or more examples, inline reconfiguration tasks (e.g., for changing the configuration when switching from uplink processing to downlink processing, and vice versa) can be employed to allow for the L2 software to be able to achieve a dynamic reconfiguration for a quicker turnaround (e.g., quicker processing). In some examples, event-based gating and/or time-based gating may be employed for precise scheduling of the uplink and downlink tasks (e.g., for the uplink and downlink processing).

In one or more aspects, during operation of the systems and techniques for wireless communications, a first device (e.g., an IOT device or a wearable device, which may be associated with a user) can receive, from a second device (e.g., a base station, such as a gNB), control information (e.g., downlink control information (DCI)) indicating a grant for transmission. The first device can generate a transport block packet (e.g., an uplink transport block packet) for transmission based on the control information (e.g., the DCI). Software (e.g., layer two (L2) software) of the first device can output a packet operations trigger indicating hardware (e.g., L2 hardware) of the first device to start processing packet operations. The hardware of the first device can process uplink packet operations and downlink packet operations in an alternating manner based on receiving the packet operations trigger. The software can output an event-based trigger or a timer-based trigger indicating the hardware to cease other processing and start processing the transport block packet. The hardware can process the transport block packet based on receiving the event-based trigger or the timer-based trigger. The processing of the transport block packet can include header insertion, ciphering, and/or integrity protection (e.g., message authentication code integrity (MACI) computation). The hardware can encode (e.g., ciphering using a cipher key that may be stored within internal memory) the transport block packet based on completion of processing the transport block packet to produce a ciphered transport block packet. The first device can transmit, to the second device, the ciphered transport block packet prior to expiration of a timeline (e.g., an N2 timeline for uplink transmissions or an N1 timeline for downlink transmissions).

In one or more examples, the control information can be transmitted via a physical downlink control channel (PDCCH). In some examples, the control information can be downlink control information (DCI). In one or more examples, the transport block packet can be an uplink transport block packet. In some examples, the hardware can be L2 hardware. In one or more examples, processing the uplink packet operations can include filtering and/or checksum insertion. In some examples, processing the downlink packet operations can include header extraction, de-ciphering, performing an integrity check, filtering, and/or checksum verification. In one or more examples, the hardware can manage switching processing of the uplink packet operations and the downlink packet operations such that the uplink packet operations and the downlink packet operations are processed in an alternating manner.

In some examples, the software can be L2 software. In one or more examples, the event-based trigger can be triggered based on completion of the build of the transport block packet. In some examples, the timer-based trigger can be triggered based on expiration of a period of time. In one or more examples, processing of the transport block packet can include header insertion, ciphering, and/or integrity protection. In one or more examples, the timeline can be an N2 timeline or an N1 timeline. In some examples, receiving the control information can indicate a start of the timeline. In one or more examples, the first device can be an IOT device or a wearable device. In one or more examples, the second device can be a base station.

As mentioned, the systems and techniques, by sharing the L2 hardware for both the uplink and downlink processing, can allow for a reduction in size of the area needed for the L2 hardware on a system on a chip. In one or more examples, the shared L2 hardware-based architecture can allow for a reduction of approximately forty (40) percent (%) in the area for the system on a chip (e.g., due to the shared logic, the reduction in area of the chip would be half with a 10% margin for additional arbitration logic). This reduction in area size for the L2 hardware can also lead to a reduction in leakage power.

Additional aspects of the present disclosure are described in more detail below.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-NB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHZ.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHZ), FR3 (e.g., above 52,600 MHZ), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHZ (e.g., 5, 10, 15, 20, 100 MHZ) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHZ), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
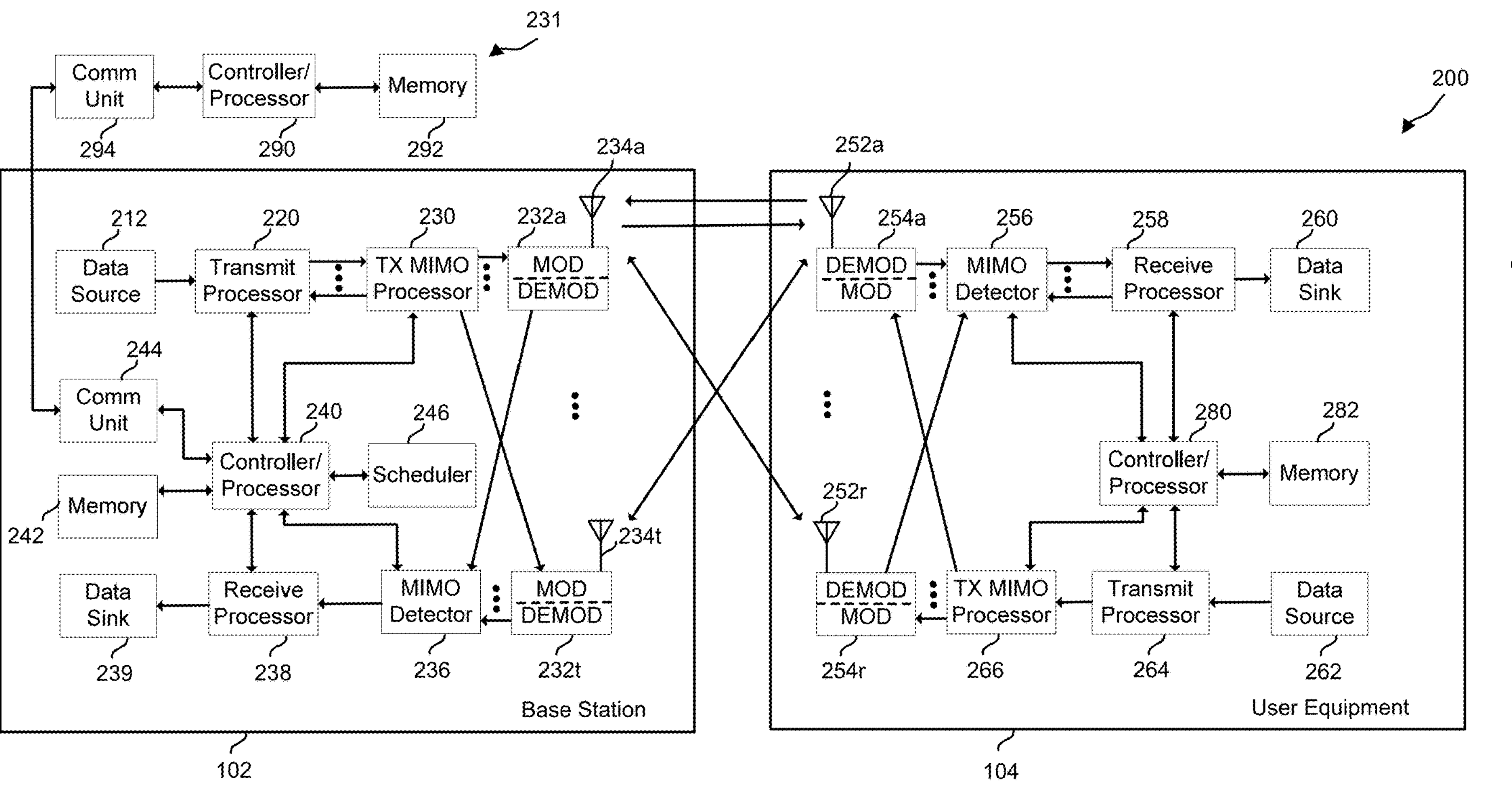
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234*a* through 234*t*, and UE 104 may be equipped with R antennas 252*a* through 252*r*, where in general $T \geq 1$ and $R \geq 1$.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream (e.g., for an orthogonal frequency-division multiplexing (OFDM) scheme and/or the like) to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to one or more demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples.

Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
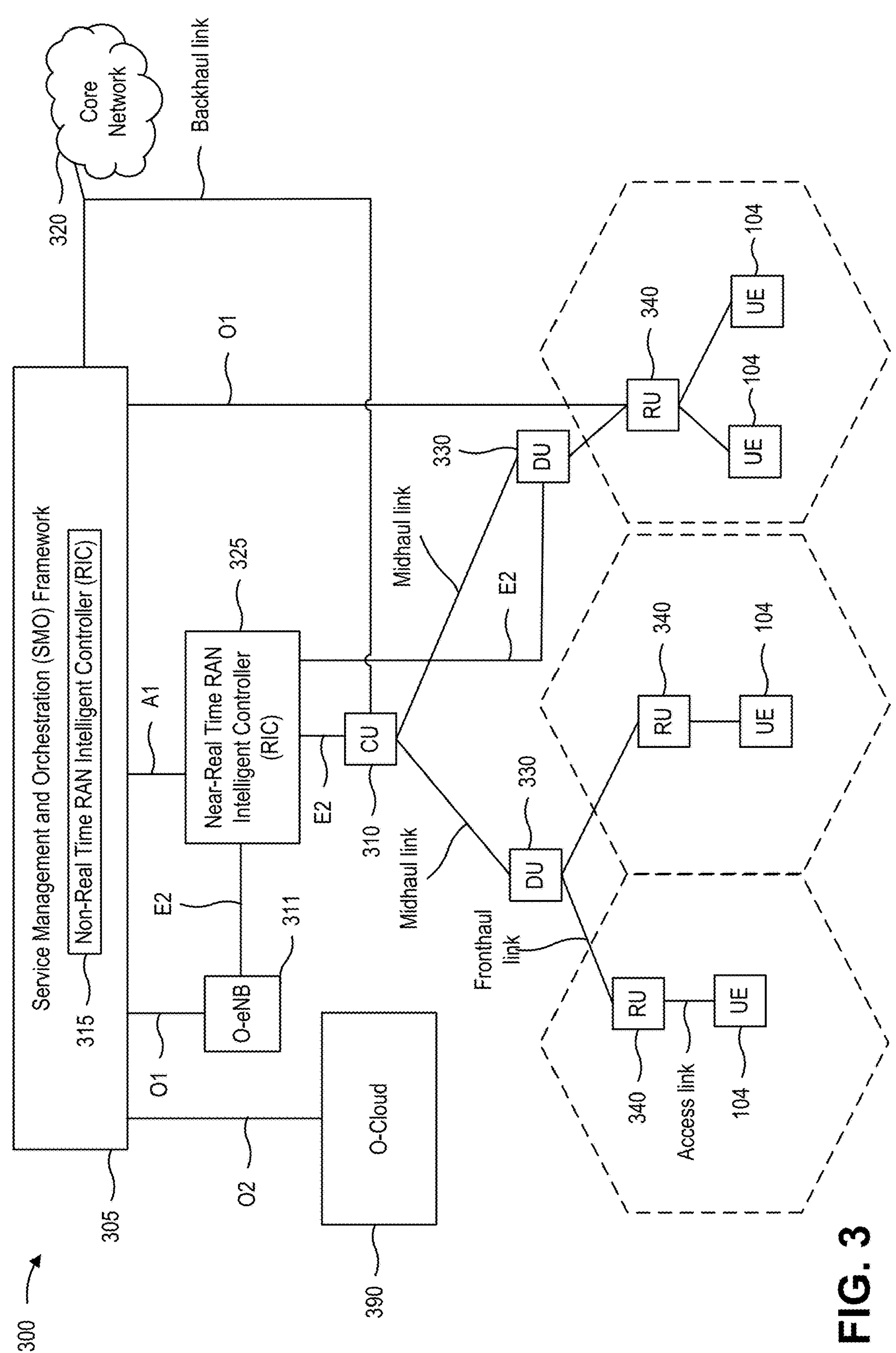
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUS 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an AI interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
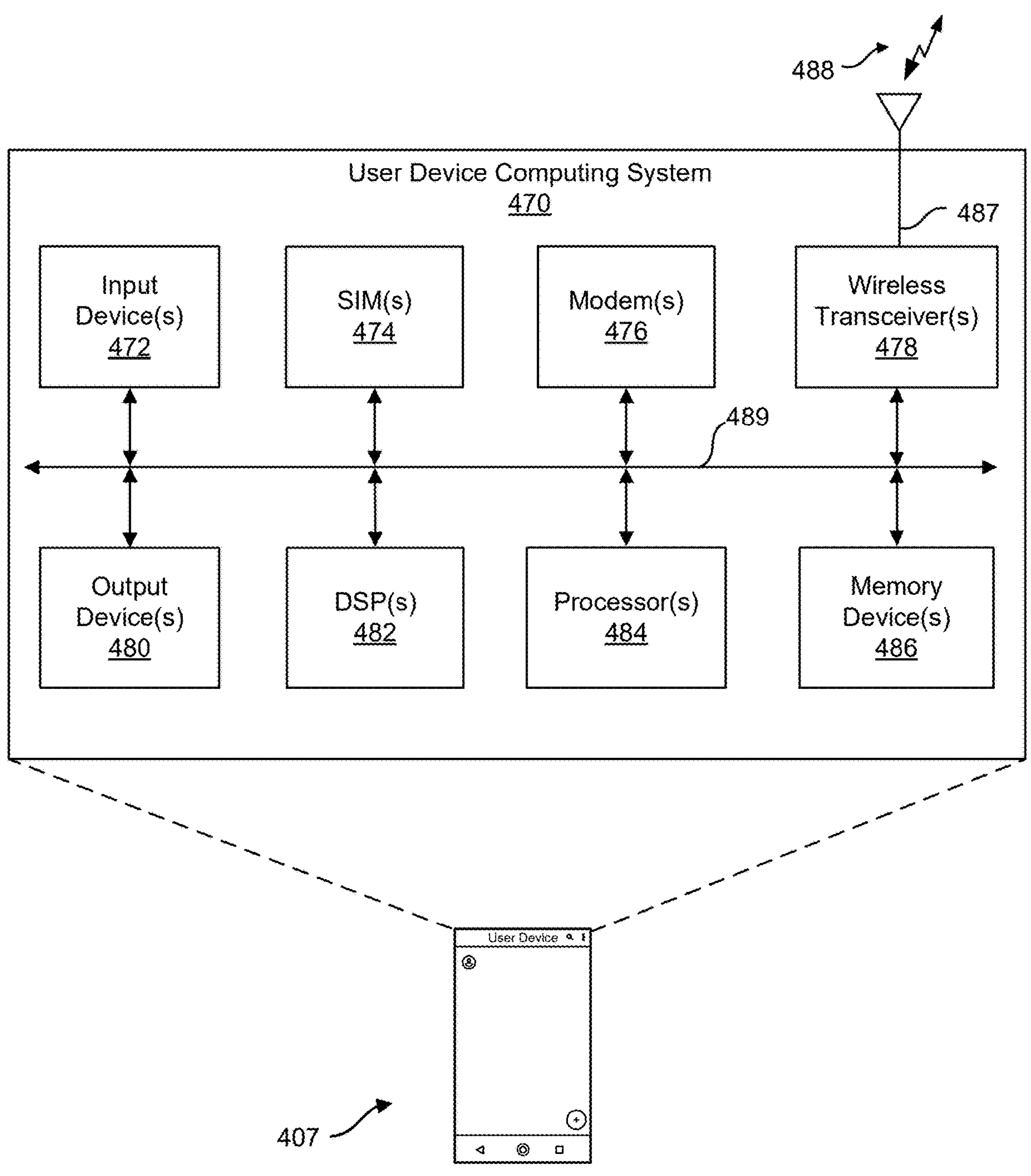
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Currently, for IoT and wearable devices (e.g., user equipment), the throughput (e.g., data rate) to be supported is lower as compared to mobile phones (e.g., smart phones) and tablets. The data rate for IoT and wearable devices is usually approximately 100 Mbps for uplink signaling, and approximately 100 Mbps for downlink signaling.

The L2 processing within the IoT and wearable devices includes internet IP packet parsing and filtering, header insertion, ciphering, etc. in the uplink direction (e.g., the direction of transmission of signals from the IoT and wearable devices to a network device, such as a base station, for example a gNB). In the downlink direction (e.g., the direction of transmission of signals from a network device, such as a base station, to the IoT and wearable devices), the L2 processing within the IoT and wearable devices includes deciphering, header extraction, parsing and packet segregation, etc. As these functions in both the uplink and downlink directions are similar, the uplink and downlink hardware for the L2 processing may be shared, provided that the throughput (e.g., data rate) can be met by the shared hardware. The sharing of L2 hardware for processing for both the uplink and downlink directions is feasible for IoT and wearable devices. This sharing of the L2 hardware can reduce the amount of area utilized on the system on a chip, which can improve the main key performance indicators for any type of mobile device.

Even though the data rate is lower for IoT and wearable devices compared to that of smartphones and tablets, the IoT and wearable devices still need to adhere to the new radio (NR) specifications. The NR specifications include an N2 parameter, which specifies a time span between receiving an uplink grant (e.g., a time of receiving an uplink grant from a base station) and a time of being ready to transmit (e.g., a time of transmission, in response to receiving the uplink grant, of an uplink signal to the base station).

Even though the shared L2 hardware can allow for a reduction in the area on a system on a chip, the sharing of the L2 hardware for the processing for both the uplink and downlink directions may adversely affect the N2 timeline. The N2 timeline may be adversely affected because the shared L2 hardware may still be occupied performing L2 downlink processing, even after receiving the uplink grant (e.g., from a base station). The shared L2 hardware being occupied with performing the downlink processing can adversely, effectively reduce the available N2 timeline for the uplink processing.

As such, an intelligent arbitration between the uplink and downlink processing by the L2 hardware is required for meeting the critical N2 timeline. Therefore, improved systems and techniques that provide an intelligent uplink-downlink arbitration (e.g., for processing by shared L2 hardware) to meet the critical N2 timeline for NR IOT and wearable devices can be useful.

In one or more aspects, systems and techniques provide intelligent uplink-downlink arbitration to meet critical timeline (e.g., N2 timeline) for NR IOT and wearable devices. In one or more examples, the systems and techniques may be applied to shared hardware (e.g., L2 hardware) for devices that have low throughputs (e.g., low data rates), such as IOT and wearable devices.

In one or more examples, the systems and techniques provide software (e.g., L2 software) that can start and end operational codes (OpCodes) for uplink-downlink arbitration lock and unlock (e.g., the starting and stopping of alternating uplink and downlink processing by the L2 hardware). In some examples, L2 modem software can trigger shared hardware (e.g., L2 hardware) after decoding an uplink grant (e.g., received from a base station).

In some examples, the L2 software may know the amount of uplink data to be transmitted by the device (e.g., IOT and/or wearable device) and, thus, the L2 software can prepare the tasks needed to process that amount of data. In one or more examples, the L2 software may program the number of packets and/or number of bytes to be processed by the L2 hardware for the downlink processing, before triggering the uplink-downlink arbitration. The preconfigured number of packets and/or number of bytes may be processed by the L2 hardware for the downlink processing before the triggering of the uplink-downlink arbitration.

In one or more examples, the L2 hardware for the downlink processing may switch the context (e.g., the configuration) for processing seamlessly with a required store and/or restore (e.g., for cases where there is an interruption in the downlink processing, and then later, the context needs to be restored to resume the downlink processing). In some examples, inline reconfiguration tasks (e.g., for changing the configuration when switching from uplink to downlink processing, and vice versa) can be employed to allow for the L2 software to be able to achieve a dynamic reconfiguration for a quicker turnaround (e.g., quicker processing). In one or more examples, event-based gating and/or time-based gating can be employed for precise scheduling of the uplink and downlink tasks (e.g., for the uplink and downlink processing).

Figure 5:
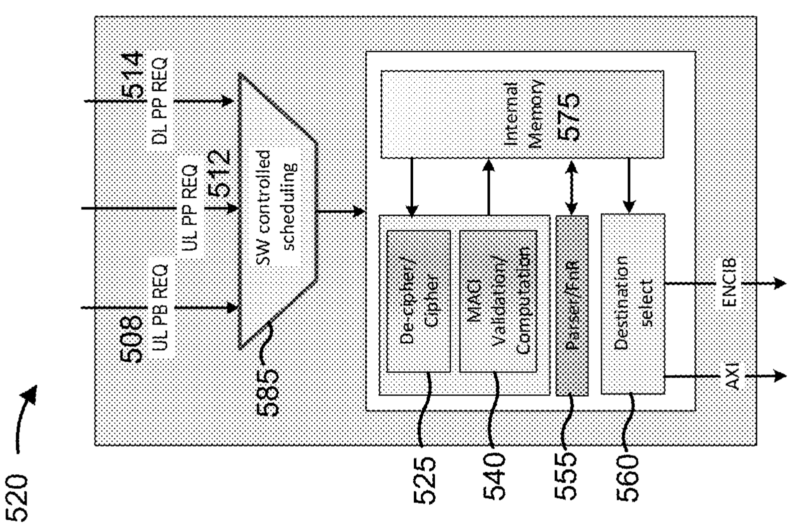
FIG. 5 is a diagram showing a comparison of a current system architecture for processing UL-DL signals that employs two engines with a disclosed system architecture for processing UL-DL signals that employs a shared engine, in accordance with some examples.

FIG. 5 shows an example of shared hardware for uplink and downlink processing. In particular, FIG. 5 is a diagram showing a comparison 500 of a current system architecture 510 for processing UL-DL signals that employs two engines with a disclosed system architecture 520 for processing UL-DL signals that employs a shared engine (e.g., shared hardware).

In one or more examples, in FIG. 5, the current system architecture 510 is shown to include a first engine (e.g., for uplink processing) that includes a cipher module 505, a message authentication code integrity (MACI) computation module 530, a destination select module 545, and an internal memory 565. The current system architecture 510 is also shown to include a second engine (e.g., for downlink processing) that includes a de-cipher module 515, a MACI validation module 535, a parser and filter and routing rules (FnR) module 550, and an internal memory 570. The current system architecture 510 is also shown to include a round-robin scheduling module 580.

During operation of the first engine of the current system architecture 510, in response to receiving an uplink packet building request (UL PB REQ) 502, which can include downlink control information (DCI), the MACI computation module 530 can perform an integrity check (e.g., a cycle redundancy check, which may be based on a calculated MACI key) on an uplink transport block packet that has been built by the first engine in response to receiving the UL PB REQ. After the MACI computation module 530 has performed an integrity check on the uplink transport block packet, the cipher module 505 can (e.g., by using a cipher key, which may be stored within the internal memory 565) encode the uplink transport block packet to produce a ciphered transport block packet for an uplink signal to be transmitted. After the cipher module 505 produces the ciphered transport block packet, the destination select module 545 can determine a destination (e.g., and route) for the ciphered transport block packet.

During operation of the second engine of the current system architecture 510, in response to receiving a downlink packet processing request (DL PP REQ) 506, the de-cipher module 515 can (e.g., by using a de-cipher key, which may be obtained from the sender) decode a received encoded downlink packet to produce the decoded downlink packet (e.g., with no encoding). After the de-cipher module 515 has produced the decoded downlink packet (e.g., deciphered downlink packet), the MACI validation module 535 can validate (e.g., by using a MACI key, which may be stored in the internal memory 570) the decoded downlink packet. After the decoded downlink packet has been validated by the MACI validation module 535, the parser and FnR module 550 can parse out the decoded downlink packet (e.g., according to a header of the decoded downlink packet). In one or more examples, the operations of the MACI validation module 535 and the parser and FnR module 550 may occur simultaneously, after the de-cipher module 515 produces the deciphered downlink packet.

In response to receiving an uplink packet processing request (UL PP REQ) 504, the second engine (e.g., the de-cipher module 515, the MACI validation module 535, and the parser and FnR module 550 of the second engine) can perform similar operations (e.g., as discussed above for a downlink packet) for an uplink packet. The round-robin scheduling module 580 can schedule the processing by the second engine (e.g., the de-cipher module 515, the MACI validation module 535, and the parser and FnR module 550 of the second engine) of the downlink packets and the uplink packets.

In one or more examples, in FIG. 5, the disclosed system architecture 520 is shown to include a single engine (e.g., for sharing both the uplink and downlink processing) that includes a de-cipher/cipher module 525, a MACI validation/computation module 540, a parser and filter and FnR module 555, a destination select module 560, and an internal memory 575. The disclosed system architecture 520 is also shown to include a software-controlled scheduling module 585.

During operation of the single engine of the disclosed system architecture 520, in response to receiving an UL PB REQ 508, which can include DCI, the MACI validation/computation module 540 may perform an integrity check (e.g., a cycle redundancy check, which can be based on a calculated MACI key) on an uplink transport block packet that has been built by the engine in response to receiving the UL PB REQ. Once the MACI validation/computation module 540 has performed an integrity check on the uplink transport block packet, the de-cipher/cipher module 525 can (e.g., by using a cipher key that can be stored within the internal memory 575) encode the uplink transport block packet to produce the ciphered transport block packet for an uplink signal to be transmitted. Once the de-cipher/cipher module 525 produces the ciphered transport block packet, the destination select module 560 can determine a destination (e.g., and route) for the ciphered transport block packet.

During operation of the engine of the current system architecture 510, in response to receiving a DL PP REQ 514, the de-cipher/cipher module 525 can (e.g., by using a de-cipher key that can be obtained from the sender) decode a received encoded downlink packet to produce the decoded downlink packet. Once the de-cipher/cipher module 525 has produced the decoded downlink packet (e.g., deciphered downlink packet), the MACI validation/computation module 540 can validate (e.g., by using a MACI key that can be stored in the internal memory 575) the decoded downlink packet. Once the decoded downlink packet has been validated by the MACI validation/computation module 540, the parser and FnR module 555 may parse out the decoded downlink packet (e.g., based on a header of the decoded downlink packet).

In response to receiving an UL PP REQ 512, the single engine can perform similar operations (e.g., as discussed above for a downlink packet) for an uplink packet. The software-controlled scheduling module 585 can schedule the processing by the engine of the uplink transport block packet, the downlink packets, and the uplink packets.

Figure 6:
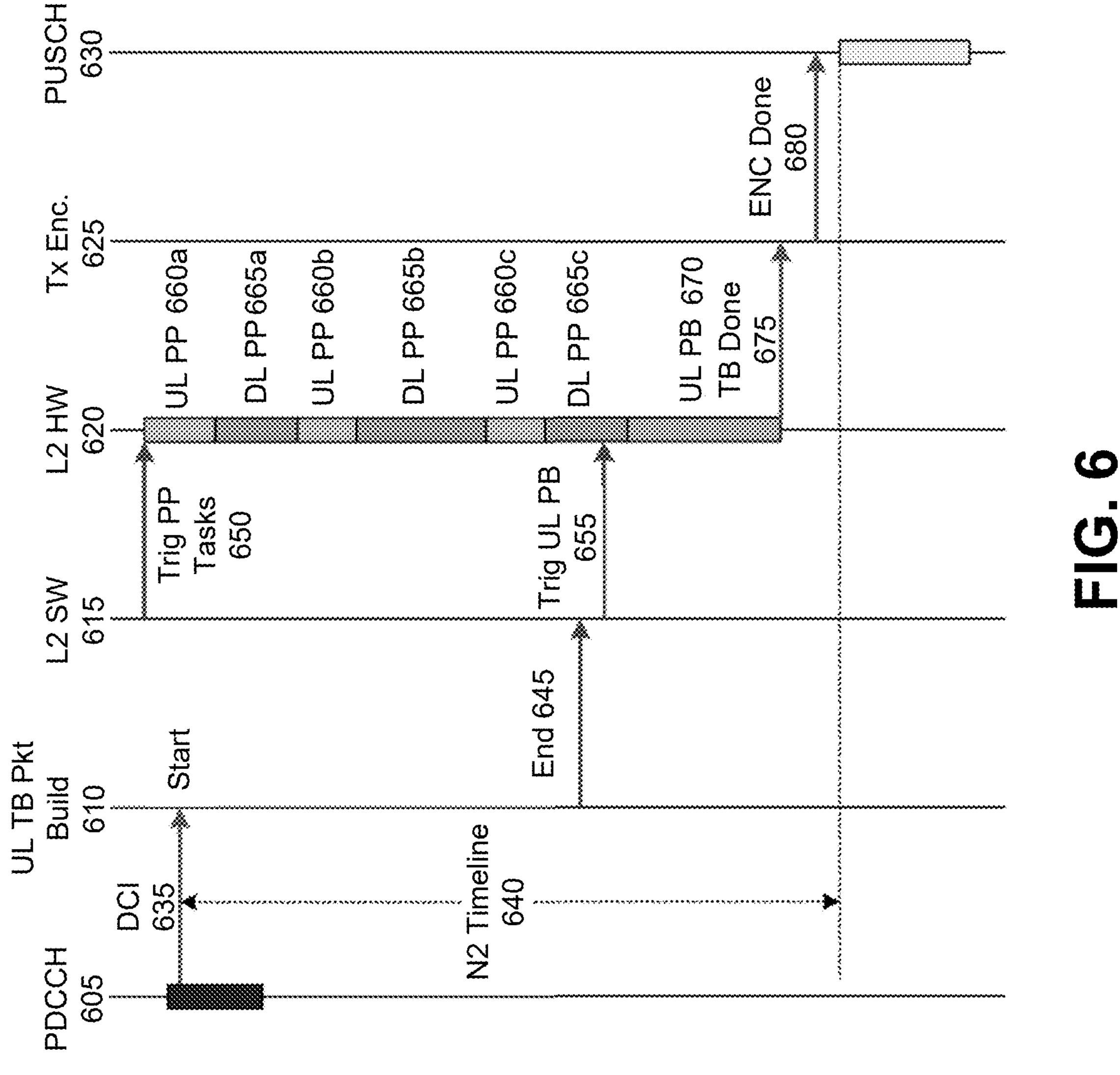
FIG. 6 is a diagram illustrating example signaling for UL-DL arbitration to meet a critical timeline for NR IOT and wearable devices, where the signaling includes an event-based gating, in accordance with some examples.
Figure 7:
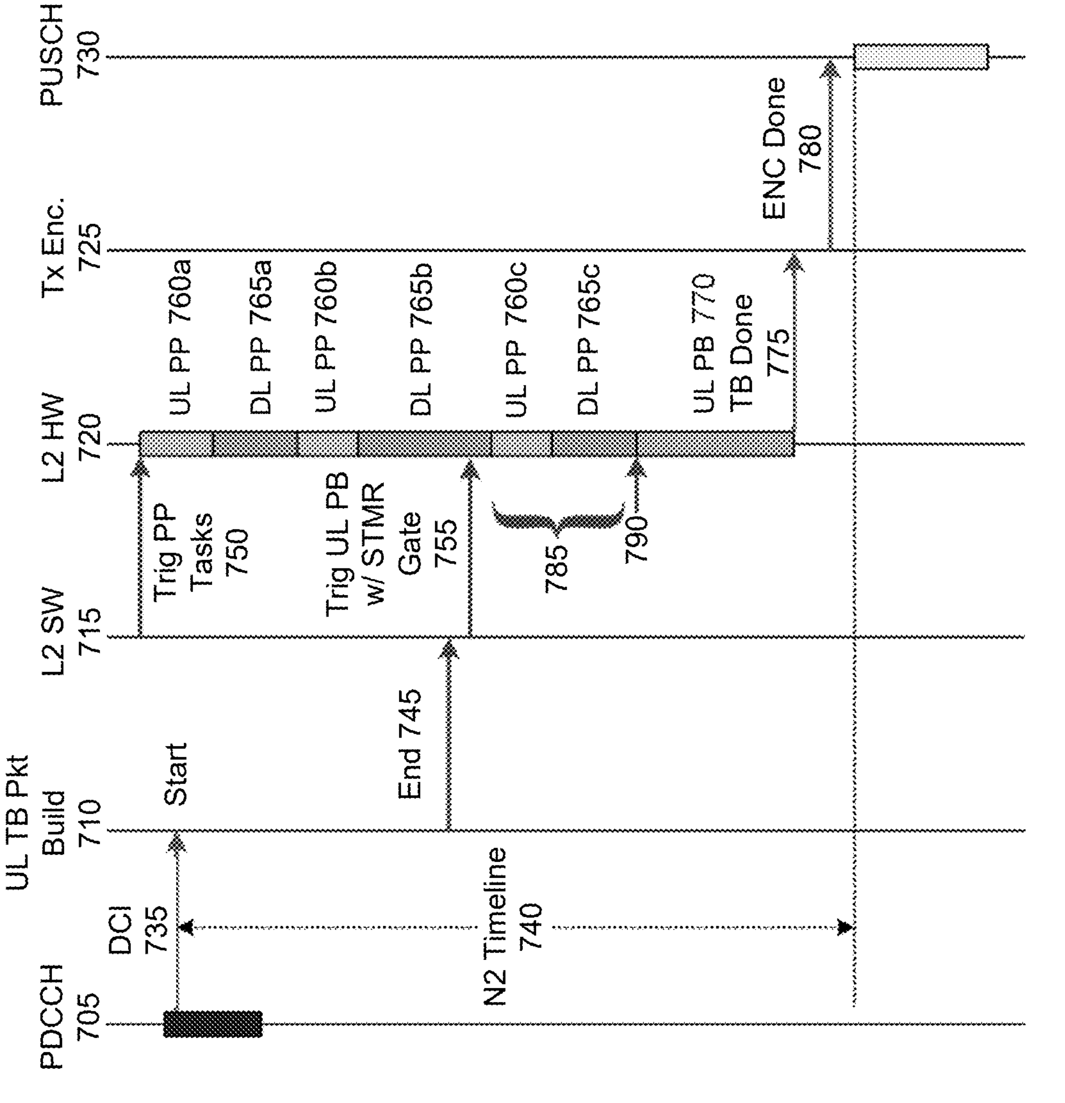
FIG. 7 is a diagram illustrating example signaling for UL-DL arbitration to meet a critical timeline for NR IOT and wearable devices, where the signaling includes a timer-based gating, in accordance with some examples.

FIGS. 6 and 7 show examples of UL-DL arbitration based on event-based gating and timer-based gating, respectively. In particular, FIG. 6 is a diagram illustrating example signaling 600 for UL-DL arbitration to meet a critical timeline (e.g., N2 timeline) for NR IOT and wearable devices, where the signaling includes an event-based gating. In FIG. 6, the signaling 600 is shown to involve a physical downlink control channel (PDCCH) 605, an uplink (UL) transport block (TB) packet (Pkt) build 610, layer 2 (L2) software (SW) 615, L2 hardware (HW) 620, a transmit (Tx) encode (Enc) 625, and a physical uplink shared channel (PUSCH) 630. In one or more examples, the signaling 600 may involve more or less components and/or signals than as is shown in FIG. 6. In some examples, the signaling 600 may involve different components (e.g., an N1 timeline) and/or different signals than as shown in FIG. 6.

During operation of the signaling 600 of FIG. 6, a first device (e.g., an IOT device or a wearable device, which may be associated with a user) can receive, from a second device (e.g., a base station, such as a gNB), control information (e.g., downlink control information (DCI) 635) indicating a grant for transmission. In one or more examples, the control information can be transmitted via the PDCCH 605.

The first device can generate a transport block packet (e.g., the uplink transport block packet build 610) for transmission based on the control information (e.g., the DCI 635). Software (e.g., L2 software 615) of the first device can output a packet processing (PP) trigger (e.g., Trig PP Tasks 650) indicating hardware (e.g., L2 hardware 620) of the first device to start processing packet operations (e.g., L2 packet operations, including UL PP and DL PP).

The hardware (e.g., L2 hardware 620) of the first device can perform uplink packet processing 660*a*, 660*b*, 660*c* (e.g., UL PP) and downlink packet processing 665*a*, 665*b*, 665*c* (e.g., DL PP) in an alternating manner based on receiving the packet processing trigger (e.g., Trig PP Tasks 650). In one or more examples, the uplink packet processing 660*a*, 660*b*, 660*c* (e.g., UL PP) can include filtering and/or checksum insertion. In some examples, the downlink packet processing 665*a*, 665*b*, 665*c* (e.g., DL PP) can include header extraction, de-ciphering, performing an integrity check, filtering, and/or checksum verification. In one or more examples, the hardware (e.g., L2 hardware 620) can manage switching of the uplink packet processing 660*a*, 660*b*, 660*c* (e.g., UL PP) and the downlink packet processing 665*a*, 665*b*, 665*c* (e.g., DL PP) such that the uplink packet processing 660*a*, 660*b*, 660*c* (e.g., UL PP) and the downlink packet processing 665*a*, 665*b*, 665*c* (e.g., DL PP) are processed in an alternating manner.

The software (e.g., L2 software 615) can output an event-based trigger (e.g., Trig UL packet building (PB) 655) indicating the hardware (e.g., L2 hardware 620) to cease other processing and start processing to build the transport block packet. In one or more examples, the event-based trigger can be triggered based on completion (e.g., END 645) of the build of the transport block packet. The hardware (e.g., L2 hardware 620) can process the transport block packet (e.g., UL PB 670 processing) based on receiving the event-based trigger (e.g., Trig UL PB 655). In one or more examples, the processing to build the transport block packet can include header insertion, ciphering, and/or integrity protection (e.g., MACI computation). As such, the operation of the hardware (e.g., L2 hardware 620) processing can be split between the uplink packet processing 660*a*, 660*b*, 660*c* (e.g., UL PP), the downlink packet processing 665*a*, 665*b*, 665*c* (e.g., DL PP), and the building of the transport block packet (e.g., UL PB 670).

The hardware (e.g., L2 hardware 620) can encode (e.g., Tx ENC 625, for example ciphering using a cipher key that may be stored within internal memory) the transport block packet based on completion of processing the transport block packet (e.g., TB Done 675) to produce a ciphered transport block packet (e.g., ENC Done 680). The first device can transmit, to the second device, the ciphered transport block packet prior to expiration of a timeline (e.g., an N2 timeline 640 or an N1 timeline). In one or more examples, the ciphered transport block packet can be transmitted via the PUSCH 630. In some examples, receiving the control information (e.g., DCI 635) can indicate a start of the timeline (e.g., N2 timeline 640).

FIG. 7 is a diagram illustrating example signaling 700 for UL-DL arbitration to meet a critical timeline (e.g., N2 timeline) for NR IOT and wearable devices, where the signaling includes a timer-based gating. In FIG. 7, the signaling 700 involves a PDCCH 705, an UL TB Pkt build 710, L2 software 715, L2 hardware 720, a Tx Enc 725, and a PUSCH 730. In some examples, the signaling 700 can involve more or less components and/or signals than as is shown in FIG. 7. In one or more examples, the signaling 700 can involve different components (e.g., an N1 timeline) and/or different signals than as shown in FIG. 7.

During operation of the signaling 700 of FIG. 7, a first device (e.g., an IOT device or a wearable device) can receive, from a second device (e.g., a base station, for example a gNB), control information (e.g., DCI 735) indicating a grant for transmission. In some examples, the control information (e.g., DCI 735) may be transmitted via the PDCCH 705.

The first device may generate a transport block packet (e.g., the uplink transport block packet build 710) for transmission based on the control information (e.g., the DCI 735). Software (e.g., L2 software 715) of the first device may output a packet processing trigger (e.g., Trig PP Tasks

750) indicating hardware (e.g., L2 hardware 720) of the first device to start processing packet operations (e.g., L2 packet operations, that can include UL PP and DL PP).

The hardware (e.g., L2 hardware 720) of the first device may perform uplink packet processing 760*a*, 760*b*, 760*c* (e.g., UL PP) and downlink packet processing 765*a*, 765*b*, 765*c* (e.g., DL PP) in an alternating manner based on receiving the packet processing trigger (e.g., Trig PP Tasks 750). In some examples, the uplink packet processing 760*a*, 760*b*, 760*c* (e.g., UL PP) may include filtering and/or checksum insertion. In some examples, the downlink packet processing 765*a*, 765*b*, 765*c* (e.g., DL PP) may include header extraction, de-ciphering, performing an integrity check, filtering, and/or checksum verification. In some examples, the hardware (e.g., L2 hardware 720) may manage switching of the uplink packet processing 760*a*, 760*b*, 760*c* (e.g., UL PP) and the downlink packet processing 765*a*, 765*b*, 765*c* (e.g., DL PP) such that the uplink packet processing 760*a*, 760*b*, 760*c* (e.g., UL PP) and the downlink packet processing 765*a*, 765*b*, 765*c* (e.g., DL PP) are processed in an alternating manner.

The software (e.g., L2 software 715) may output a timer-based trigger (e.g., Trig UL PB with system timer (STMR) Gate 755) indicating the hardware (e.g., L2 hardware 720) to cease other processing and start processing to build the transport block packet. In some examples, the timer-based trigger (e.g., Trig UL PB with STMR Gate 755) may be triggered based on an expiration of a period of time (e.g., time delay 785). In one or more examples, the hardware (e.g., L2 hardware 720) may process the transport block packet (e.g., UL PB 770 processing) based on the expiration of the period of time (e.g., the end 790 of the time delay 785), where the period of time (e.g., time delay 785) starts when the event-based trigger (e.g., Trig UL PB with STMR Gate 755) is received by the hardware (e.g., L2 hardware 720). In one or more examples, processing to build the transport block packet may include header insertion, ciphering, and/or integrity protection (e.g., MACI computation). As such, the operation of the hardware (e.g., L2 hardware 720) processing may be split between the uplink packet processing 760*a*, 760*b*, 760*c* (e.g., UL PP), the downlink packet processing 765*a*, 765*b*, 765*c* (e.g., DL PP), and the building of the transport block packet (e.g., UL PB 770).

The hardware (e.g., L2 hardware 720) may encode (e.g., Tx ENC 725, for example ciphering using a cipher key that may be stored within internal memory) the transport block packet based on completion of processing the transport block packet (e.g., TB Done 775) to produce a ciphered transport block packet (e.g., ENC Done 780). The first device may transmit, to the second device, the ciphered transport block packet prior to expiration of a timeline (e.g., an N2 timeline 740 or an N1 timeline). In some examples, the ciphered transport block packet may be transmitted via the PUSCH 730. In one or more examples, receiving the control information (e.g., DCI 735) can indicate a start of the timeline (e.g., N2 timeline 740).

In one or more aspects, the UL PP and the DL PP processing (e.g., by the L2 hardware) can have a round robin arbitration, where the winner (PP) of the arbitration can then be arbitrated with the UL PB processing. In one or more examples, there can be a fixed priority for processing (e.g., by the L2 hardware) between the UL PB and the PP (e.g., UL PP and DL PP), where the UL PB can have the highest priority for the processing. In one or more examples, the UL PB can be in terms of one or more transport blocks (e.g., TBs). The L2 software can configure the start and end of the build of the transport block(s). In some examples, the L2 software can delay the transport block processing (e.g., by the L2 hardware) by employing an event-based trigger that is dependent upon completion of a task or a timer-based trigger that is dependent upon expiration of a period of time. In one or more examples, the L2 software can configure an arbitration boundary for the processing of the UL PP and the DL PP. In some examples, the UL PP and/or DL PP tasks can be processed on a per packet and/or per bytes on a batch basis. The L2 software can configure the number of packets and/or number of bytes for the batch basis, after which a re-arbitration should occur. In one or more examples, the complete processing (e.g., by the L2 hardware) of a PP task may require multiple arbitrations.

Figure 8:
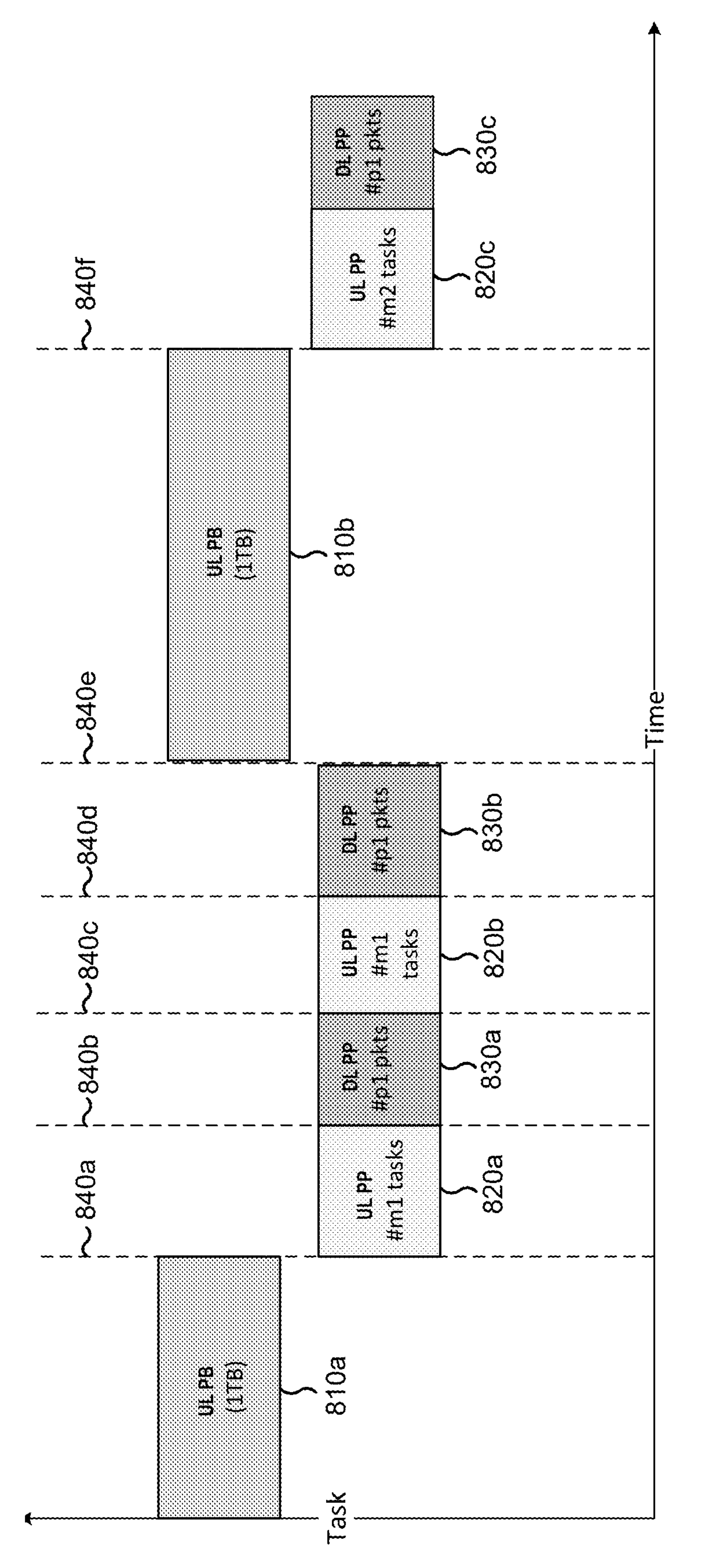
FIG. 8 is a graph illustrating an example operation timeline for UL-DL arbitration to meet a critical timeline for NR IOT and wearable devices, in accordance with some examples.

FIG. 8 shows a typical task arbitration scheme for processing (e.g., by L2 hardware) of UL PB, DL PP, and UL PP operations. In one or more examples, arbitration between the processing (e.g., by L2 hardware) of the UL PB and the PP operations (e.g., UL PP and DL PP operations) may occur when the last task (e.g., UL PB task, DL PP task, or UL PP task) executed (e.g., performed) is a first-in first-out (FIFO) discarded and the task queue is empty, or when the UL PB processing (e.g., by the L2 hardware) is timer-based triggered. In some examples, the software (e.g., L2 software) can control the number of tasks, packets, bytes, and/or batches for each PER operation to be processed, when the software (e.g., L2 software) receives a grant (e.g., including the DCI information).

In particular, FIG. 8 is a graph 800 illustrating an example operation timeline for UL-DL arbitration to meet a critical timeline (e.g., N2 timeline) for NR IOT and wearable devices. In FIG. 8, the x-axis denotes time, and the y-axis denotes the task being processed (e.g., performed). In the graph 800, at time is equal to zero, the software (e.g., L2 software) may start to process an UL PB operation 810*a* (e.g., perform an uplink transport block packet build).

At the time of line 840*a*, the hardware (e.g., L2 hardware) may begin processing the UL PP operations 820*a*, 820*b* (e.g., where each UL PP operation has m1 number of tasks) and the DL PP operations 830*a*, 830*b* (e.g., where each DL PP operation has p1 number of packets) in an alternating manner. The hardware (e.g., L2 hardware) can control the switching between the processing of the UL PP tasks and the DL PP tasks occurs at the times associated with the arbitration lines 840*b*, 840*c*, 840*d*. At each arbitration line 840*b*, 840*c*, 840*d*, 840*e* if there is no UL PB operation ready for processing, the hardware (e.g., L2 hardware) will continue to process PP operations in an alternating manner, otherwise the hardware will process the available UL PB operation.

At the time of arbitration line 840*c*, a UL PB operation 810*b* is ready for processing and, as such, the software (e.g., L2 software) can start to process the UL PB operation 810*b* (e.g., perform an uplink transport block packet build). At the time of line 840*f*, the hardware (e.g., L2 hardware) may begin processing the UL PP operations 820*c* (e.g., where each UL PP operation has m1 number of tasks) and the DL PP operations 830*c* (e.g., where each DL PP operation has p1 number of packets) in an alternating manner. And, the UL-DL arbitration process can continue as previously discussed.

Figure 9:
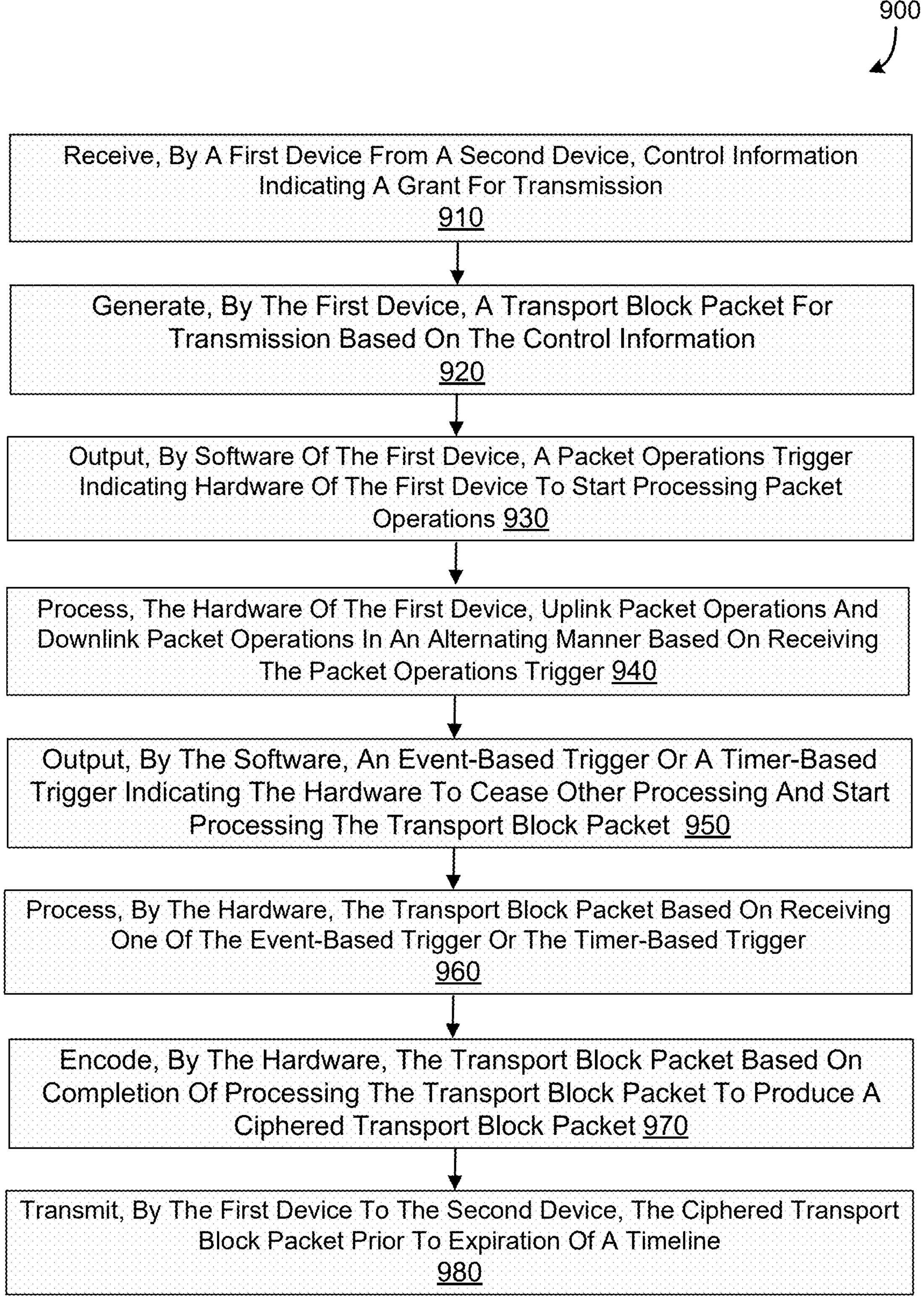
FIG. 9 is a flow diagram illustrating an example of a process for wireless communications, in accordance with some examples.

FIG. 9 is a flow chart illustrating an example of a process 900 for wireless communications. The process 900 can be performed by a first device (e.g., UE 104 of FIG. 1, UE 104 of FIG. 3, wireless device 407 of FIG. 4, and/or a computing device or computing system 1000 of FIG. 10) or by a component or system (e.g., a chipset, one or more processors such as one or more central processing units (CPUs), digital signal processors (DSPs), graphics processing units (GPUs), any combination thereof, and/or other type of processor(s), or other component or system) of the first device. In some cases, the first device can include an internet of things (IOT) device, a mobile device, a wearable device, an extended reality (XR) device, or other type of device. The operations of the process 900 may be implemented as software components that are executed and run on one or more processors (e.g., processor 1010 of FIG. 10 or other processor(s)). Further, the transmission and reception of signals by the first device in the process 900 may be enabled, for example, by one or more antennas and/or one or more transceivers such as one or more wireless transceiver(s) (e.g., the receive processor 258, transmit processor 264, antenna 252-254*r*, and/or other component of FIG. 1, the wireless transceiver (s) 478, the antenna 487, and/or other component of FIG. 4, the communication interface 1040 of FIG. 10, etc.).

At block 910, the computing device (or component thereof, such as a transceiver, antenna, and/or other component) can receive, from a second device (e.g., a base station, such as the base station 102 or other base station of FIG. 1, the base station 102 of FIG. 2, one or more components of the disaggregated base station 300 of FIG. 3, etc.) the control information indicating a grant for transmission. In some aspects, the control information is transmitted via a physical downlink control channel (PDCCH). In some cases, the control information is downlink control information (DCI) (e.g., uplink packet building request (UL PB REQ) 502 of FIG. 5, DCI 635 of FIG. 6, DCI 735 of FIG. 7, etc.).

At block 920, the computing device (or component thereof) can generate a transport block packet for transmission based on the control information. In some aspects, the transport block packet is an uplink transport block packet (e.g., the uplink transport block packet build 610 of FIG. 6 or other transport block packet described herein).

At block 930, the computing device (or component thereof) can output, using the software of the first device, a packet operations trigger indicating hardware of the first device to start processing packet operations. In some cases, the hardware is layer two (L2) hardware (e.g., L2 HW 620 of FIG. 6, L2 HW 720 of FIG. 7, etc.). In some cases, the software is L2 software (e.g., the L2 SW 615 of FIG. 6, the L2 SW 715 of FIG. 6, etc.). In some cases, the hardware is configured to manage switching processing of the uplink packet operations and the downlink packet operations such that the uplink packet operations and the downlink packet operations are processed in an alternating manner, such as shown in FIG. 6 and/or in FIG. 7.

At block 940, the computing device (or component thereof) can process, by the hardware of the first device, uplink packet operations and downlink packet operations in an alternating manner based on receiving the packet operations trigger (e.g., uplink packet processing 660*a*, 660*b*, 660*c* (e.g., UL PP) and downlink packet processing 665*a*, 665*b*, 665*c* (e.g., DL PP) of FIG. 6, UL PP 760*a*, 760*b*, 760*c* and DL PP 765*a*, 765*b*, 765*c* of FIG. 7, etc.). In some aspects, to process the uplink packet operations, the computing device (or component thereof) can perform filtering, checksum insertion, and/or other operations. In some cases, to process the downlink packet operations, the computing device (or component thereof) can perform at least one of header extraction, de-ciphering, an integrity check, filtering, checksum verification, and/or other operations.

At block 950, the computing device (or component thereof) can output, using the software, an event-based trigger (e.g., (e.g., Trig UL packet building (PB) 655 of FIG. 6) or a timer-based trigger (e.g., Trig UL PB with system timer (STMR) Gate 755 of FIG. 7) indicating the hardware to cease other processing and start processing the transport block packet. In some aspects, the event-based trigger is triggered based on completion of a build of the transport block packet, such as shown in FIG. 6. In some cases, the timer-based trigger is triggered based on expiration of a period of time, such as shown in FIG. 7.

At block 960, the computing device (or component thereof) can process, by the hardware, the transport block packet based on receiving one of the event-based trigger or the timer-based trigger (e.g., as shown in FIG. 6 and/or in FIG. 7. In some aspects, to process the transport block packet, the computing device (or component thereof) can perform header insertion, ciphering, integrity protection, and/or other operations or functions.

At block 970, the computing device (or component thereof) can encode, by the hardware, the transport block packet based on completion of processing the transport block packet to produce a ciphered transport block packet.

At block 980, the computing device (or component thereof, such as a transceiver, antenna, and/or other component) can transmit (or output for transmission) to the second device, the ciphered transport block packet prior to expiration of a timeline. In some aspects, the timeline is an N2 timeline (e.g., as shown in FIG. 6 and in FIG. 7) or an N1 timeline. In some cases, receiving the control information indicates a start of the timeline.

In some cases, the computing device of process 900 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device of process 900 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 900 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
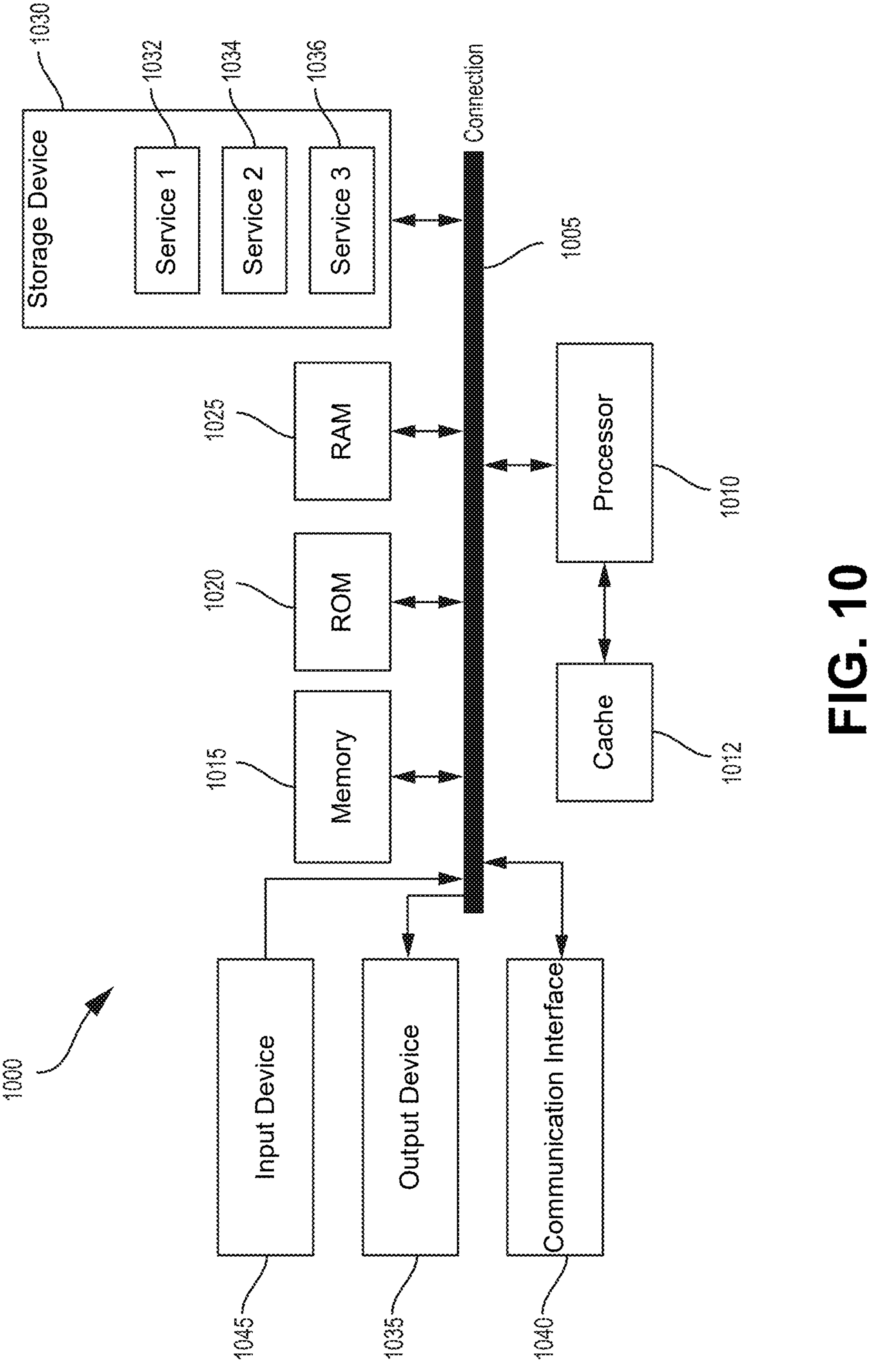
FIG. 10 is a diagram illustrating an example of a system for implementing certain aspects described herein.

FIG. 10 is a block diagram illustrating an example of a computing system 1000, which may be employed for intelligent UL-DL arbitration to meet critical timeline (e.g., N2 timeline) for NR IOT and wearable devices. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000.

Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1040 may also include one or more range sensors (e.g., LiDAR sensors, laser range finders, RF radars, ultrasonic sensors, and infrared (IR) sensors) configured to collect data and provide measurements to processor 1010, whereby processor 1010 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. A first device for wireless communications, the first device comprising: at least one memory configured to store software of the first device; and at least one processor coupled to the at least one memory and configured to: receive, from a second device, control information indicating a grant for transmission; generate a transport block packet for transmission based on the control information; output, using the software of the first device, a packet operations trigger indicating hardware of the first device to start processing packet operations; process, by the hardware of the first device, uplink packet operations and downlink packet operations in an alternating manner based on receiving the packet operations trigger; output, using the software, one of an event-based trigger or a timer-based trigger indicating the hardware to cease other processing and start processing the transport block packet; process, by the hardware, the transport block packet based on receiving one of the event-based trigger or the timer-based trigger; encode, by the hardware, the transport block packet based on completion of processing the transport block packet to produce a ciphered transport block packet; and output, for transmission to the second device, the ciphered transport block packet prior to expiration of a timeline.

Aspect 2. The first device of Aspect 1, wherein the control information is transmitted via a physical downlink control channel (PDCCH).

Aspect 3. The first device of any of Aspects 1 or 2, wherein the control information is downlink control information (DCI).

Aspect 4. The first device of any of Aspects 1 to 3, wherein the transport block packet is an uplink transport block packet.

Aspect 5. The first device of any of Aspects 1 to 4, wherein the hardware is layer two (L2) hardware.

Aspect 6. The first device of any of Aspects 1 to 5, wherein, to process the uplink packet operations, the at least one processor is configured to perform at least one of filtering or checksum insertion.

Aspect 7. The first device of any of Aspects 1 to 6, wherein, to process the downlink packet operations, the at least one processor is configured to perform at least one of header extraction, de-ciphering, an integrity check, filtering, or checksum verification.

Aspect 8. The first device of any of Aspects 1 to 7, wherein the hardware is configured to manage switching processing of the uplink packet operations and the downlink packet operations such that the uplink packet operations and the downlink packet operations are processed in an alternating manner.

Aspect 9. The first device of any of Aspects 1 to 8, wherein the software is layer two (L2) software.

Aspect 10. The first device of Aspect 1. wherein the event-based trigger is triggered based on completion of a build of the transport block packet.

Aspect 11. The first device of any of Aspects 1 to 10, wherein the timer-based trigger is triggered based on expiration of a period of time.

Aspect 12. The first device of any of Aspects 1 to 11, wherein, to process the transport block packet, the at least one processor is configured to perform at least one of header insertion, ciphering, or integrity protection.

Aspect 13. The first device of any of Aspects 1 to 12, wherein the timeline is one of an N2 timeline or an N1 timeline.

Aspect 14. The first device of any of Aspects 1 to 13, wherein receiving the control information indicates a start of the timeline.

Aspect 15. The first device of any of Aspects 1 to 14, wherein the first device is one of an internet of things (IOT) device or a wearable device.

Aspect 16. The first device of any of Aspects 1 to 15, wherein the second device is a base station.

Aspect 17. The first device of any of Aspects 1 to 16, further comprising at least one transceiver configured to: receive the control information; and transmit the ciphered transport block packet.

Aspect 18. A method of wireless communications, the method comprising: receiving, by a first device from a second device, control information indicating a grant for transmission; generating, by the first device, a transport block packet for transmission based on the control information; outputting, by software of the first device, a packet operations trigger indicating hardware of the first device to start processing packet operations; processing, by the hardware of the first device, uplink packet operations and downlink packet operations in an alternating manner based on receiving the packet operations trigger; outputting, by the software, one of an event-based trigger or a timer-based trigger indicating the hardware to cease other processing and start processing the transport block packet; processing, by the hardware, the transport block packet based on receiving one of the event-based trigger or the timer-based trigger; encoding, by the hardware, the transport block packet based on completion of processing the transport block packet to produce a ciphered transport block packet; and transmitting, by the first device to the second device, the ciphered transport block packet prior to expiration of a timeline.

Aspect 19. The method of Aspect 18, wherein the control information is transmitted via a physical downlink control channel (PDCCH).

Aspect 20. The method of any of Aspects 18 or 19, wherein the control information is downlink control information (DCI).

Aspect 21. The method of any of Aspects 18 to 20, wherein the transport block packet is an uplink transport block packet.

Aspect 22. The method of any of Aspects 18 to 21, wherein the hardware is layer two (L2) hardware.

Aspect 23. The method of any of Aspects 18 to 22, wherein processing the uplink packet operations comprises at least one of filtering or checksum insertion.

Aspect 24. The method of any of Aspects 18 to 23, wherein processing the downlink packet operations comprises at least one of header extraction, de-ciphering, performing an integrity check, filtering, or checksum verification.

Aspect 25. The method of any of Aspects 18 to 24, wherein the hardware manages switching processing of the uplink packet operations and the downlink packet operations such that the uplink packet operations and the downlink packet operations are processed in an alternating manner.

Aspect 26. The method of any of Aspects 18 to 25, wherein the software is layer two (L2) software.

Aspect 27. The method of any of Aspects 18 to 26, wherein the event-based trigger is triggered based on completion of a build of the transport block packet.

Aspect 28. The method of any of Aspects 18 to 27, wherein the timer-based trigger is triggered based on expiration of a period of time.

Aspect 29. The method of any of Aspects 18 to 28, wherein processing of the transport block packet comprises at least one of header insertion, ciphering, or integrity protection.

Aspect 30. The method of any of Aspects 18 to 29, wherein the timeline is one of an N2 timeline or an N1 timeline.

Aspect 31. The method of any of Aspects 18 to 30, wherein receiving the control information indicates a start of the timeline.

Aspect 32. The method of any of Aspects 18 to 31, wherein the first device is one of an internet of things (IOT) device or a wearable device.

Aspect 33. The method of any of Aspects 18 to 32, wherein the second device is a base station.

Aspect 34. A non-transitory computer-readable medium having stored thereon instructions that, when executed by at least one processor, cause the at least one processor to perform operations according to any of Aspects 18 to 33.

Aspect 35. An apparatus for wireless communications, the apparatus including one or more means for performing operations according to any of Aspects 18 to 33.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A first device for wireless communications, the first device comprising:

at least one memory configured to store software of the first device; and at least one processor coupled to the at least one memory and configured to:

receive, from a second device, control information indicating a grant for transmission;

generate a transport block packet for transmission based on the control information;

output, using the software of the first device, a packet operations trigger indicating hardware of the first device to start processing packet operations;

process, by the hardware of the first device, uplink packet operations and downlink packet operations in an alternating manner based on receiving the packet operations trigger;

output, using the software, one of an event-based trigger or a timer-based trigger indicating the hardware to cease other processing and start processing the transport block packet;

process, by the hardware, the transport block packet based on receiving one of the event-based trigger or the timer-based trigger;

encode, by the hardware, the transport block packet based on completion of processing the transport block packet to produce a ciphered transport block packet; and output, for transmission to the second device, the ciphered transport block packet prior to expiration of a timeline.

2. The first device of claim 1, wherein the control information is transmitted via a physical downlink control channel (PDCCH).

3. The first device of claim 1, wherein the control information is downlink control information (DCI).

4. The first device of claim 1, wherein the transport block packet is an uplink transport block packet.

5. The first device of claim 1, wherein the hardware is layer two (L2) hardware.

6. The first device of claim 1, wherein, to process the uplink packet operations, the at least one processor is configured to perform at least one of filtering or checksum insertion.

7. The first device of claim 1, wherein, to process the downlink packet operations, the at least one processor is configured to perform at least one of header extraction, de-ciphering, an integrity check, filtering, or checksum verification.

8. The first device of claim 1, wherein the hardware is configured to manage switching processing of the uplink packet operations and the downlink packet operations such that the uplink packet operations and the downlink packet operations are processed in an alternating manner.

9. The first device of claim 1, wherein the software is layer two (L2) software.

10. The first device of claim 1, wherein the event-based trigger is triggered based on completion of a build of the transport block packet.

11. The first device of claim 1, wherein the timer-based trigger is triggered based on expiration of a period of time.

12. The first device of claim 1, wherein, to process the transport block packet, the at least one processor is configured to perform at least one of header insertion, ciphering, or integrity protection.

13. The first device of claim 1, wherein the timeline is one of an N2 timeline or an N1 timeline.

14. The first device of claim 1, wherein receiving the control information indicates a start of the timeline.

15. The first device of claim 1, wherein the first device is one of an internet of things (IOT) device or a wearable device.

16. The first device of claim 1, wherein the second device is a base station.

17. The first device of claim 1, further comprising at least one transceiver configured to:

receive the control information; and transmit the ciphered transport block packet.

18. A method of wireless communications, the method comprising:

receiving, by a first device from a second device, control information indicating a grant for transmission;

generating, by the first device, a transport block packet for transmission based on the control information;

outputting, by software of the first device, a packet operations trigger indicating hardware of the first device to start processing packet operations;

processing, by the hardware of the first device, uplink packet operations and downlink packet operations in an alternating manner based on receiving the packet operations trigger;

outputting, by the software, one of an event-based trigger or a timer-based trigger indicating the hardware to cease other processing and start processing the transport block packet;

processing, by the hardware, the transport block packet based on receiving one of the event-based trigger or the timer-based trigger;

encoding, by the hardware, the transport block packet based on completion of processing the transport block packet to produce a ciphered transport block packet; and transmitting, by the first device to the second device, the ciphered transport block packet prior to expiration of a timeline.

19. The method of claim 18, wherein the control information is downlink control information (DCI) and is transmitted via a physical downlink control channel (PDCCH), and wherein the transport block packet is an uplink transport block packet.

20. The method of claim 18, wherein the hardware manages switching processing of the uplink packet operations and the downlink packet operations such that the uplink packet operations and the downlink packet operations are processed in an alternating manner.

* * * * *